UNITED STATES PATENT OFFICE 1,950,421

DYESTUFFS DERIVED FROM CYANO ACETIC ACID

Ottmar Wahl, Leverkusen-I. G. Werk, Germany, assignor to General Aniline Works, Inc., New York, N. Y., a corporation of Delaware No Drawing. Application April 19, 1932, Serial No. 606,293. In Germany April 22, 1931

3 Claims. (Cl. 260—105)

The present invention relates to dyestuffs, more particularly it relates to dyestuffs which may be represented by the probable general formula:

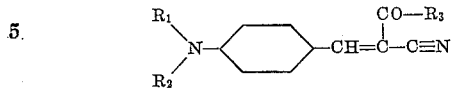

wherein $R_1$ and $R_2$ represent hydrogen, alkyl, hydroxyalkyl, aralkyl or aryl, such as methyl, ethyl, propyl, butyl, isobutyl, hydroxyethyl, benzyl, phenyl, naphthyl, and $R_3$ stands for alkoxy or for the radical of an aromatic amine, such as methoxy, ethoxy, the radical of aniline, N-methylaniline, naphthylamine, and wherein the nuclei may be substituted for example, by alkyl, alkoxy, halogen, the nitro group and the carboxylic acid group.

My dyestuffs are obtainable by causing about molecular quantities of a cyano-acetic acid ester or of a cyano-acetic acid arylamide, respectively, and of an aromatic p-aminoaldehyde of the benzene series which may be substituted in the amino group by alkyl, aralkyl or aryl to react upon each other, favorably in the presence of a suitable solvent, such as alcohol and pyridine, and with the addition of a soluble alkaline reacting agent, such as piperidine, ethylenediamine, and sodium- or potassium-ethylate, said alkaline reacting agent favoring the reaction.

The process can be started at room temperature, but it proceeds more quickly when applying heat, thus it can be carried out between room temperature and the boiling point of the reaction mixture.

The process may be illustrated by the following equation:

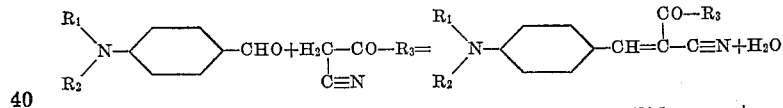

the figures $R_1$, $R_2$ and $R_3$ meaning the same as stated above.

Instead of starting with the p-aminoaldehydes of the kind referred to above, there may be used the corresponding benzylidene compounds in carrying to effect my invention.

My dyestuffs are generally yellow to red powders, dyeing cellulose acetate silk from their aqueous suspensions or solutions respectively yellow to orange shades of good fastness to light.

My invention is illustrated by the following examples, without being limited thereto:

*Example 1.*—Molecular quantities of cyanoacetic acid ethylester and p-diethylaminobenzaldehyde are dissolved in alcohol, and the reaction is initiated by the addition of a small quantity of piperidine and is finished by refluxing. On cooling, the dyestuff of the probable formula:

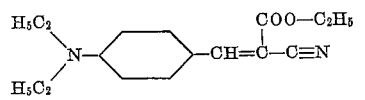

crystallizes; after recrystallization it is obtained from alcohol in beautiful crystals of the melting point 95° C. It dyes acetate silk very clear shades of good fastness to light.

*Example 2.*—Molecular quantities of the benzylidene compound of p-dimethylaminobenzaldehyde with unsymmetrical p-dimethylaminophenylenediamine of the following formula:

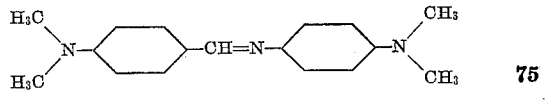

and cyano-acetic acid ethylester are treated as described in Example 1. Thus is formed besides unsymmetrical dimethyl-p-phenylenediamine the yellow dyestuff of the following formula:

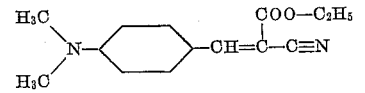

crystallizing from alcohol with the melting point of 125° C. It dyes acetate silk somewhat more greenish than the dyestuffs described in Example 1.

*Example 3.*—Molecular quantities of p-diethylaminobenzaldehyde and cyano-acetic acid-anilide are treated as described in Example 1. The yellow dyestuff of the following formula:

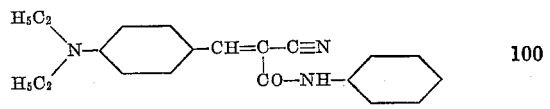

crystallizes from alcohol with the melting point 180° C.

I claim:
1. The dyestuffs of the probable general formula:

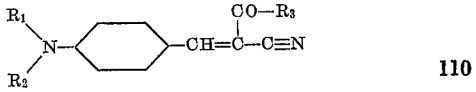

wherein $R_1$ and $R_2$ stand for hydrogen, alkyl, hydroxyalkyl, aralkyl or aryl and $R_3$ stands for alkoxy or for the radical of an aromatic primary amine, and wherein the nuclei may be substituted by substituents selected from the group consisting of alkyl, alkoxy, halogen, the nitro group and the carboxylic acid group, being generally yellow to red powders and dyeing cellulose acetate silk yellow to orange shades of good fastness to light.

2. The dyestuffs of the probable general formula:

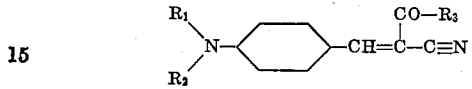

wherein $R_1$ and $R_2$ stand for alkyl groups and $R_3$ stands for alkoxy or for the radical of an aromatic primary amine, and wherein the nuclei may be substituted by substituents selected from the group consisting of alkyl, alkoxy, halogen, the nitro group and the carboxylic acid group, being generally yellow to red powders and dyeing cellulose acetate silk yellow to orange shades of good fastness to light.

3. The dyestuff of the probable formula:

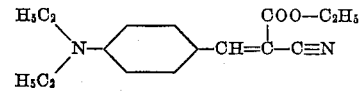

being a crystalline substance of the melting point 95° C. and dyeing acetate silk very clear yellow shades of good fastness to light.

OTTMAR WAHL.